UNITED STATES PATENT OFFICE

HENRY W. KELLY, OF CHICAGO, ILLINOIS.

PROCESS OF SEPARATING GOLD.

SPECIFICATION forming part of Letters Patent No. 545,205, dated August 27, 1895.

Application filed February 11, 1895. Serial No. 538,007. (No specimens.)

*To all whom it may concern:*

Be it known that I, HENRY W. KELLY, a citizen of the United States, residing at Chicago, in the county of Cook and State of Illinois, have discovered and invented certain new and useful Improvements in Processes for Separating Gold, of which the following is a full, clear, and exact specification.

This invention relates to improvements in processes for separating gold and other precious minerals from ore, but more particularly to the separation and saving of "dust" and "float" gold, which in ore and gold-bearing sand is in a comminuted condition so fine that it is suspended in and floats on water, and will pass through the best filtering-paper without leaving a trace of gold, and when disturbed in the least, in a dry state, will float off in the air, in a smoky-looking impalpable dust, a gold so fine that although visibly partially collectible in pans no means has heretofore been found whereby it may be retained and saved.

It is of common knowledge among miners that under the most improved processes of to-day for separating gold from ore only about one-half of the gold contained in the ore is actually saved, and that this gold is in the tailings and water resulting from the modern processes and thrown away as valueless, and that this loss is due to the dust or float gold escaping during the stamping of the ore, but mainly by reason of its suspension in the water used in the extraction of coarse gold, or gold in metallic form and of a sufficient weight to settle through the water upon the amalgamating-plates.

In all processes heretofore employed for extracting gold from ore there is a considerable loss of gold owing to there being no provision for extracting dirt which obstructs the passage of the metallic gold through the water to contact with the amalgamating-plates, nor for extracting a certain slime occurring in all gold-bearing ores and known among miners by the several names of "grease," "slime," and "manganese," which adheres to and forms a coating on the amalgamating-plates and prevents the adhering of gold thereto and frequently carries off gold that is already on the plates, and hence for this reason is frequently called "gold-robber." Indeed there are now mines rich in gold which cannot be worked commercially successfully because of the amount of gold-robber contained in the ore. This is particularly true in South America and to quite an extent in mines in this country, in Arizona, Montana, and Colorado, where, in many instances, after successfully working a mine for some time they have been closed down on striking ore containing so much gold-robber that not one dollar in ten of the gold contained in the ore could be extracted.

While the primary object of my invention is to recover dust and float gold which is now entirely lost, my invention has for its further object the separation of gold-robber from gold-bearing and other ore previous to its final recovery, whether by amalgamating-plates or retorting process, and my invention therefore includes a process by which there is an increase of separation of metallic gold from ore and an entire saving of dust or float gold heretofore not recoverable. I have discovered not only a means for separating gold-robber entirely from all mineral contained in the ore, and that gold-robber, when suspended in water, prevents the extraction of gold therefrom, but a means by which gold-robber may be divested of its power to retain gold against extraction from water, and hence whereby all the gold in any given body of water may be completely extracted therefrom and absolutely saved.

In carrying out the process of my invention and discovery I grind up a ton or more of gold-bearing ore, by the use of any of the usual dry processes or machinery, to a fineness that will pass through a screen of from No. 80 to No. 100 mesh, and to every ton of this ore I add and mix in a dry state from five to eight pounds of bone-dust. When the ground ore and bone-dust is thoroughly mixed I place them in a vat and add water and continually stir the mass for from six to eight hours, the amount of water being sufficient to rise about an inch or an inch and a half above the ore and bone-dust when settled. After stirring for from six to eight hours the mass is then permitted to stand until settled, which it will probably do in an hour or so, and at the end of that time it will be found that the metallic gold, black sand, which contains about thirty-three per cent. of gold, the iron, and other metals will have settled to the bottom, with the dirt next and the bone-dust on top of all. The bone-dust will have a pulpy appearance and the water between the bone-dust and the surface will be found to have a clouded and somewhat thick appearance, with indications of oil on the surface, while on top of the water will float a foam all the way from a quarter to three-quarters of an inch in thickness and having the appearance of a discolored sea-foam. If permitted to stand this water would retain this discolored appearance for days and even weeks, and while I know it contains gold I have repeatedly demonstrated that very little gold can be extracted therefrom without the employment of the second step in my process, which has for its purpose to neutralize and precipitate the grease throughout the body of water and in the bone-dust that has settled, and at the same time to precipitate the foam that has been floating upon the top of the water, and which seems to consist of grease and bone-dust and some gold sand and dirt suspended in the floating bone-dust.

To these ends the second step of my process consists in adding to and stirring in the surface-water and the settled bone-dust from three to five pounds of alkali—such, for example, as potash, caustic soda, and bicarbonate of soda—and I have used to advantage the ordinary concentrated lye of commerce and the alkali such as may be scraped up at any time on the plains in the far West, the quantity of lye being varied within the limits mentioned according to the amount of grease appearing in the water, but it will not substantially vary from three to five pounds to the ton of ore. After the lye is added the mixture is permitted to stand for from four to six hours, but stirred occasionally, say three or four times during that time; but in no event is it necessary or advisable to stir below the bone-dust which, after stirring, settles in the vat, for I have found that there is practically no grease below the bone-dust, and therefore no occasion to stir up the dirt and ore, and indeed I may, after adding the alkali, draw off the water and shovel the bone-dust into another tank and there do the stirring; but in practice after the contents of the vat has stood with the alkali in it for from four to six hours with an occasional stirring the water is siphoned or pumped off through a filter, which may be of any suitable construction or material for the purpose, although I have so far found that filtering-paper in a large funnel or trough answers every purpose. The water passed through the filtering-paper is then conducted to the amalgamating-plates, and after shoveling out of the vat and throwing away the bone-dust and the dirt the ore in the bottom of the vat is then dried and afterward run through a retort; but instead thereof it may be conducted over amalgamating-plates in the usual manner. After adding the alkali and stirring for a few moments and then permitting the contents of the vat to settle, the water is seemingly entirely clear of its foamy, clouded, discolored, and greasy appearance, and there is absolutely no foam on it whatever; but I secure the best results—that is, more gold—by letting the contents of the vat stand several hours after adding the alkali and occasionally stirring the same, for within that period all grease and slimy substances therein are fully neutralized and completely precipitated, and this is equally true throughout the mass of bone-dust which has settled therein. The neutralizing and therefore destruction of the grease and slime leaves the fine gold suspended in the water, and the free gold in the bottom of the vat is in a cleansed condition, causing its perfect adherence to amalgamating-plates should they be used instead of retorting when retorts are not accessible. While I am unable to tell exactly what the action of the bone-dust is, I do know that after stirring up the water and ore that the grease rises, the metal and dirt descend, and that the bone-dust lies between the grease and slime on the one hand and the dirt and ore on the other hand.

I am also aware of the fact that bone-dust contains carbonate and phosphate of lime, and while I have found that by the use of these materials, both separately and combined, I can get some gold from the water, more from the phosphate than the carbonate, and more from their combined use than either, that I do not get nearly so good results as from the use of bone-dust, and this is also true of French chalk and prepared chalk, and it will therefore be understood that while I preferably use bone-dust my invention includes the use of phosphate of lime or carbonate of lime separately or combined, of French chalk or prepared chalk separately or combined, or any material the equivalent of any of these things in their action upon the slime and gold-robber contained in ores, as hereinbefore described.

I have practically and experimentally applied my process to gold-bearing ores from substantially every mining-district in the United States and from various parts of the world, and have yet to find a gold-bearing ore from which, by my process, I do not get at least double the amount of gold from the greatest amount ever claimed to have been taken therefrom, and frequently where the output from a mine has been at most twenty dollars per ton I have recovered from the same ore by my process double and more than double that amount, for the reason that I save the flour or float gold, which, as before intimated, is equal to and often in excess of the metallic gold, the flour-gold being so fine, in many instances, that in dry crushing all of it, substantially, will float away in the air; and, in fact, in some of the gold-bearing ores in which gold has been extracted by my process I have found it necessary in milling to cover the ore with canvas to catch a substantial portion of the gold which would otherwise have risen in dust and floated away.

In conclusion, it should be observed that I consider the filtering of the water after the treatment of the ore with bone-dust and alkali, as hereinbefore described, an important feature of my invention, for that it removes all dirt and enables the amalgamating-plates to extract every particle of gold from the water, which they will do completely after the water has passed over two plates. A third plate will not extract a particle of gold, but it will be no substantial departure from my invention, as herein described and claimed, to omit the filtering. It should also be observed that instead of mixing the pulverized ore and bone-dust in a dry state they may be mixed in a wet state; but in practice it is quicker and more convenient to mix them in a dry state.

Having thus described my invention, what I claim as new therein, and desire to secure by Letters Patent, is—

1. In the separation of gold and other precious metals from ore, the herein described process which consists in mixing pulverized ore with bone dust or its equivalent, then adding water in excess of the bulk of said mixture, then agitating the same for from six to eight hours, then letting the mixture stand until settled and finally eliminating the ore at the bottom of the mass substantially as described.

2. The herein described process of separating gold the same consisting in mixing pulverized ore with bone dust and after adding water in excess of said ore and bone dust, then agitating the same for from six to eight hours and after settling adding and stirring in alkali with the water and bone dust and letting it stand for from four to six hours with an occasional stirring, and finally drawing off the water and passing it over amalgamating plates and extracting the gold therefrom, substantially as described.

3. The herein described process of separating gold the same consisting in mixing pulverized ore with bone dust and after adding water in excess of the bulk of said ore and bone dust, then agitating the same for from six to eight hours, and after settling adding alkali and letting the mass stand for from four to six hours with an occasional stirring, then drawing off the water, passing the same through a filter and conducting it over amalgamating plates, substantially as described.

4. The herein described process of separating gold from ore, the same consisting in mixing bone dust with pulverized ore then adding water in excess of the bulk of bone dust and ore, then stirring the mass for the time and in the manner specified and after settling adding an alkali, then letting it stand for from four to six hours with an occasional stirring, then drawing off and filtering the water, then passing the filtered water over amalgamating plates for extracting the gold therefrom, and finally removing the bone dust and dirt from the remaining heavy and settled ore, and then recovering the gold therefrom, substantially as described.

HENRY W. KELLY.

Witnesses:
   JNO. G. ELLIOTT,
   EDNA B. JOHNSON.